United States Patent

[11] 3,560,649

[72] Inventor Robert H. Anderson
Portland, Oreg.

[21] Appl. No. 640,526
[22] Filed May 23, 1967
[45] Patented Feb. 2, 1971
[73] Assignee Tektronix, Inc.
Beaverton, Oreg.
a corporation of Oregon

[54] CATHODE RAY TUBE WITH PROJECTION MEANS
12 Claims, 8 Drawing Figs.

[52] U.S. Cl. .................................................. 178/7.5
[51] Int. Cl. .................................................. H04n 5/64, H04n 5/72
[50] Field of Search .................................................. 178/6LCR, 7.5, 7.85, 7.83; 313/92; 350/276

[56] References Cited

UNITED STATES PATENTS

| | | | |
|---|---|---|---|
| 2,169,838 | 8/1939 | Herbst | 178/7.5 |
| 2,415,226 | 2/1947 | Sziklia | 178/7.5 |
| 2,943,964 | 7/1960 | Goldenberg | 350/276 |
| 3,037,419 | 6/1962 | Nixon | 350/276 |
| 3,384,712 | 5/1968 | Grubn | 178/7.5D |

*Primary Examiner*—Robert L. Griffin
*Assistant Examiner*—Barry Leibowitz
*Attorney*—Buckhorn, Blore, Klarquist and Sparkman

ABSTRACT: A display means including a cathode-ray tube provided with light projection means or imaging a graticule or the like substantially in the plane of the cathode-ray tube's phosphor screen. Light projection is from the rear of the screen. The apparatus includes means for impeding or blocking the transmission of direct light originating in the projection means in order to prevent the occurence of a bright spot in the display.

ROBERT H. ANDERSON
*INVENTOR*

*BY*
*BUCKHORN, BLORE, KLARQUIST & SPARKMAN*
*ATTORNEYS*

ROBERT H. ANDERSON
*INVENTOR*

*BY*
*BUCKHORN, BLORE, KLARQUIST & SPARKMAN*
*ATTORNEYS*

CATHODE RAY TUBE WITH PROJECTION MEANS

BACKGROUND OF THE INVENTION

This invention relates to display apparatus and particularly to improved cathode-ray tube apparatus incorporating rear projection means.

Relatively few optical devices project an image on a screen from the side opposite the observer in spite of convenience and other advantages of the resulting compact equipment. If the observed image is provided with any appreciable brightness, the image usually suffers from the presence of a bright spot having increased intensity compared to the rest of the image. The origin of this bright spot is an undiffused portion of the light passing directly through the screen. This problem has hindered prior attempts to provide a cathode-ray tube having rear projection means for focusing an optical image on the tube's face, superimposed upon an electron beam trace, because the phosphor screen does not provide enough diffusion of the projected image. The bright spot also interferes with observation of the electron beam trace, particularly when such trace is not excessively brilliant.

SUMMARY OF THE INVENTION

According to the present invention, a rear projection means is located at the rear of the cathode-ray tube's phosphor screen for providing a real image in substantially the plane of the phosphor screen. The phosphor partially acts as a diffusing projection screen. Additional means are provided for substantially impeding or blocking the direct undiffused portion of the light originating in the projection means and passing through the phosphor from reaching an observer in front of the cathode-ray tube. In accordance with a preferred embodiment of the present invention, such light impeding means comprises light scattering or light diffusing means substantially in the plane of the phosphor screen. The desired real image is provided upon or near the plane of such light scattering or diffusing means, while direct light which passes through the phosphor, because of scattering at the diffusing faceplate, does not cause annoyance to the observer viewing the cathode-ray tube presentation. The light diffusing means does not interfere with the electron beam trace for the reason that such means, being located in substantially the same plane as the phosphor screen, has substantially no optical effect upon the phosphor image, and also for the reason that the trace is already emitting rays of light over a wide range of angular directions.

It is therefore an object of the present invention to provide an improved apparatus wherein both electrical information and optical information may be viewed coincidently and concurrently on the same screen.

It is another object of the present invention to provide an improved display apparatus for presenting a cathode-ray tube electron beam trace and a substantially coincident optical image, without an attendant bright spot.

It is another object of the present invention to provide an improved display apparatus including a cathode-ray tube and a projection means for providing an improved light image on the face of the tube, without substantially decreasing the readability of the electron beam trace.

It is another object of the present invention to provide an improved display apparatus including a cathode-ray tube and compact light projection means for projecting a light image on the screen of the cathode-ray tube from the rear thereof, wherein light does not interfere with observation of either the light image or of the cathode-ray tube electron beam trace.

It is another object of the present invention to provide improved apparatus for providing identification information or the like on the screen of a cathode-ray tube.

It is another object of the present invention to provide improved rear-projection cathode-ray tube apparatus which retains the trace brightness advantage of aluminized phosphor screens without blocking the projected image with an opaque aluminum layer.

It is another object of the present invention to provide a storage tube which tube may also be operated in a nonstorage mode with the brightness advantage of aluminized phosphor screens, and may be used for improved rear projection without destroying either the trace-storage ability or the rear-projection ability with a conductive opaque aluminum layer.

The subject matter which I regard as my invention is particularly pointed out and distinctly claimed in the concluding portion of this specification. The invention, however, both as to organization and method of operation, together with further advantages and objects thereof, may best be understood by reference to the following description taken in conjunction with the accompanying drawings wherein like reference characters refer to like elements.

DRAWINGS

DETAILED DESCRIPTION

Figures 1, 2, 3, 4:
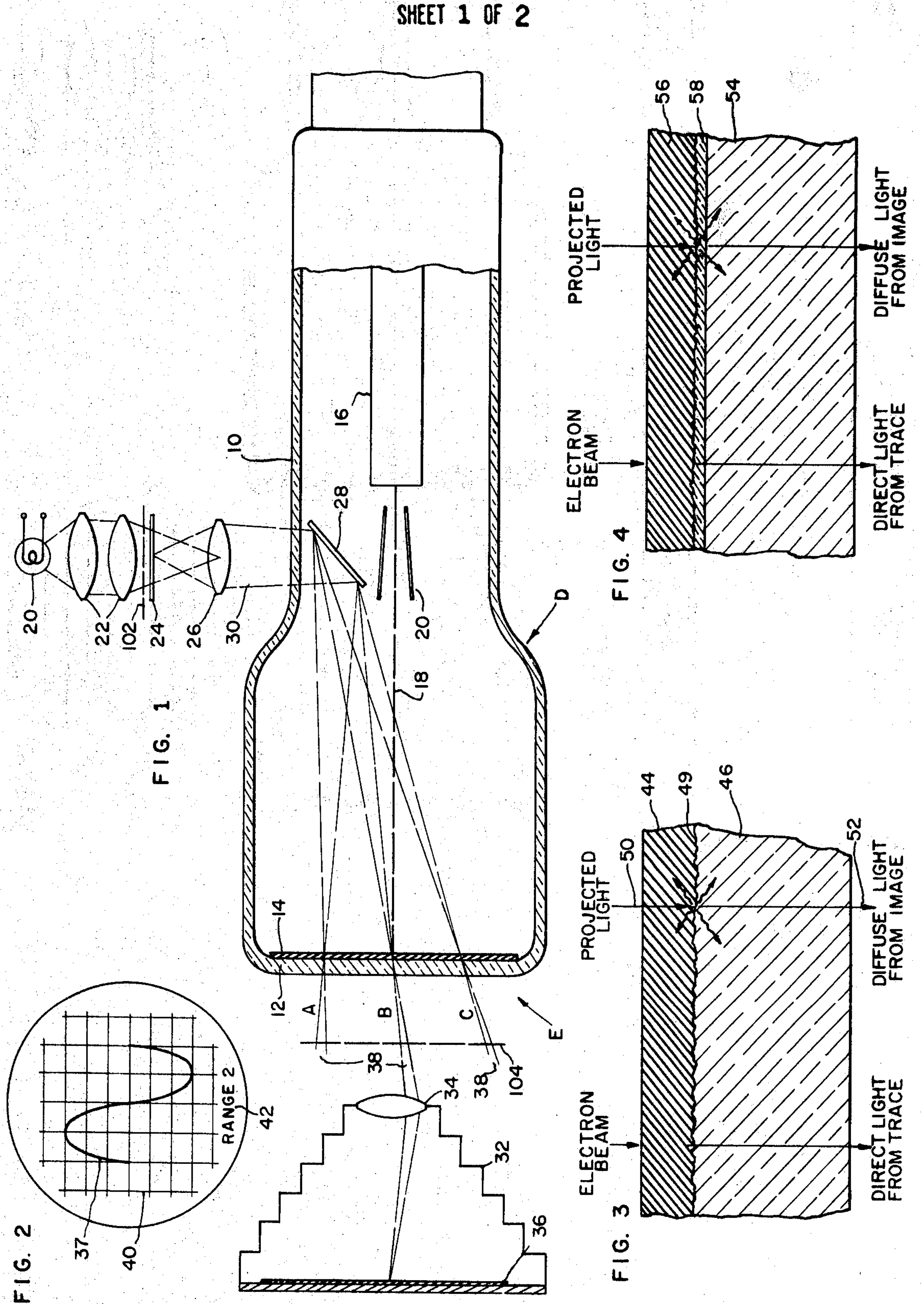
FIG. 1 is a schematic representation of a cathode-ray tube and optical projection means comprising apparatus in accordance with the present invention.
FIG. 2 is an example of a presentation or display provided by the FIG. 1 apparatus.
FIG. 3 is a cross-sectional view of a first faceplate and screen structure suitably employed with the FIG. 1 apparatus.
FIG. 4 is a cross-sectional view of a second faceplate and screen structure for use with the FIG. 1 apparatus.

Referring to FIG. 1, illustrating an apparatus in accordance with the present invention, a cathode-ray tube 10 includes a glass faceplate 12 provided with a substantially planar phosphor screen 14 on the inside surface thereof and an electron gun 16 at the end of the cathode-ray tube opposite the phosphor screen 14. Electron gun 16 directs a beam of electrons 18 toward phosphor screen 14, electron beam 18 being deflected by deflection plates 20 so as to provide a luminescent trace on the screen 14 corresponding to desired deflection information. Although only one set of deflection plates is illustrated in this schematic representation, it is understood that both horizontal and vertical deflection plates will be included in the usual cathode-ray tube, or other means will be employed for providing deflection of the electron beam in a desired manner in accordance with an electrical signal.

The display apparatus according to the present invention also includes projection means comprising light source 20 providing illumination directed by condenser lens means 22 upon a slide 24 containing information which is to be optically projected for viewing from the front of the cathode-ray tube. A projection lens 26 images slide 24 at substantially the plane of phosphor screen 14. A mirror 28, which may be disposed at approximately a 45° angle with respect to the tube axis, is suitably located inside the cathode-ray tube for reflecting light rays 30 from projection lens 26 toward the front of the tube, so that a real image of slide 24 is provided at the face of the tube.

A camera, generally indicated at 32, may be employed for photographing the combined information viewable from the front of the cathode-ray tube, namely, the electron beam trace produced by electron beam 18 directed upon the phosphor layer, and the real image provided by the projection means. Such camera includes a lens 34 and a film 36 for receiving and recording the combined image. Lens 34 may alternatively represent the eye of an observer.

An example of a combined image is illustrated in FIG. 2 wherein the electron beam trace is indicated at 37 and the light image comprises a graticule 40 with nomenclature 42 for suitably identifying the trace being viewed. In this case, slide 24 contains such graticule and nomenclature information. The graticule may be used for measuring the electron beam trace, and the nomenclature portion of the presentation can alternatively indicate, for example, the sweep speed or vertical gain employed to provide the particular electron beam trace in an oscilloscope or the like.

Heretofore apparatus of the type illustrated in FIG. 1 has been troubled with a bright spot problem wherein bright light passes through the faceplate of the cathode-ray tube as indicated at 38. If an observer were located at point D, that is, if the image were viewed from inside of or back of the cathode-ray tube, a fairly uniformly illuminated optically projected image would be observed having no central bright spot. Similarly, an observer at location E considerably off the axis of the cathode-ray tube would see a uniform image. However, a camera or observer on the axis of the tube would see a central bright spot. The source of this spot is not light scattered by the phosphor. Instead it is light transmitted through holes in the phosphor or the like, which light is unrefracted and continues in its original direction. Converging rays at A and C arrive at the screen over a rather small subtended angle. The portion of this light which passes through the phosphor diverges over the same narrow angle at which it arrived at the screen. None of these rays are directed into the camera lens or the eye lens of the observer and therefore rays at A and C, for example, cause no bright spot. Some of the rays arriving at point B, however, pass directly through the screen into the camera or eye where they contribute added intensity forming a bright spot. This unscattered light diverges from the real image in the plane of the phosphor and forms a real image in the plane of the film 36. The bright spot consists largely of an intensification of a bright image area. The bright spot image is a real image, not a virtual image, and is sometimes termed an "aerial" image since it occurs in the empty space in small holes in the phosphor layer. An observer may erroneously conclude that he sees in such a bright spot an image of the projector bulb filament in the plane of the viewing screen. However, the image of the filament in such apparatus is designed to occur in the projection lens or somewhat in front of it and cannot be seen in focus by a camera or eye focused on the phosphor screen. Thus, the bright spot is actually a real aerial image of the projected slide seen through the phosphor and superimposed on the normal or real image of the same object which comprises the desired optical image.

FIG. 3 illustrates a faceplate and screen portion of the FIG. 1 apparatus employed for alleviating the bright spot problem. Referring to FIG. 3, a phosphor layer 44 is disposed over faceplate 46 on the side of the faceplate toward the electron gun in the tube such that the electron beam may provide a trace image in the usual manner. However, in this instance the glass faceplate is roughened as illustrated at 49 to provide scattering means or light diffusing means substantially in the plane of the phosphor layer. The portion of the projected light at 50 which passes through the phosphor layer without being diffused by it is scattered by roughened surface 49, the roughened surface refracting or reflecting direct light in a plurality of directions. The bright spot which would otherwise be caused thereby is substantially eliminated. Diffuse light from the real image projected upon the roughened surface 49 is observable through the faceplate 46 as indicated at 52 with the roughened surface 49 substantially comprising the source thereof.

The faceplate 46 may be roughened by sandblasting to provide the light scattering surface 49. In a particular example, P31 phosphor was then deposited over the sandblasted surface to a thickness used conventionally for a nonaluminized phosphor, in order to provide the phosphor screen 44. Instead of sandblasting, the roughened surface at 49 may be provided by grinding or etching before application of the phosphor. Alternatively, the glass faceplate may be hot pressed with the fine roughened pattern. For such a purpose, a heated metal press (not shown) having such a pattern can be applied to the faceplate during manufacture.

As indicated the diffuse light from the image passes through faceplate 46, but in addition direct light from the electron beam trace passes therethrough. The electron beam trace is transmitted without substantial brightness loss, this being of considerable advantage because the electron beam trace has an inherent brightness limitation. It is readily possible, on the other hand, to vary and increase the intensity of the projected light image. It is also important to note that substantially no undesired additional scattering or diffusion of the light from the electron beam trace takes place, since this light is initially emitted over a wide range of angles, compared to the projected image.

Thus light from two different sources passes through the same diffusion screen, but the light from only one such source is further diffused. The roughened or sandblasted surface at 49 on the faceplate acts as an assemblage of irregular lenses or prisms which refract and scatter light from the projected slide, but which have no magnifying effect on the electron beam trace because the trace originates from substantially the same plane as that occupied by the irregular lenses or prisms. Since the electron beam image is substantially unaltered, there is substantially no loss in definition thereof. There is also substantially little or no intensity loss of light generated by the electron beam striking the phosphor. Therefore, an improved projected image is produced without substantial effect upon the electron beam image. In the present application, "substantially in the same plane as the phosphor layer" is taken to mean in substantial contact with a planar portion of the phosphor layer, or at least in close proximity thereto. At least contiguous contact with the phosphor layer is preferred.

Referring to FIG. 4, a glass faceplate 54 is provided with a phosphor layer 56 on the side thereof facing the electron gun in the tube. In addition, the surface of the faceplate 54 is prepared before deposition of the phosphor layer by depositing a glass frit material on such surface. The glass frit material is irregular, and preferably has a lower melting temperature than the faceplate. This frit material is heated to melt or soften and from a mass fused to the faceplate, but not to the extent that a smooth layer is produced. The result is an irregular glass layer 58 located between the faceplate 54 and phosphor layer 56. The direct projected light is scattered in the same manner as hereinbefore described so as to alleviate the bright spot problem. The direct light from the trace as well as the diffuse light from the image pass through faceplate 54 as previously indicated.

Figures 5, 6:
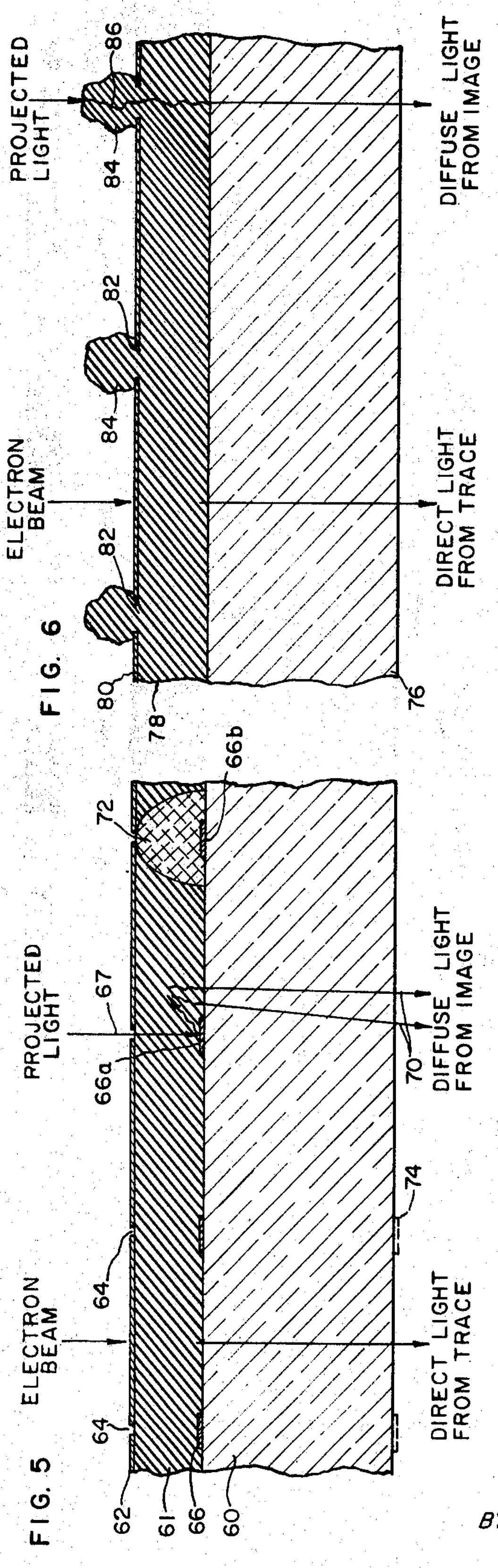
FIG. 5 is a cross-sectional view of a third faceplate and screen structure for use with the FIG. 1 apparatus.
FIG. 6 is a cross section of a fourth faceplate and screen structure.

Referring to FIG. 5, a glass faceplate 60 is provided with a phosphor screen 61 on the side thereof toward the tube's electron beam, and a light opaque layer 62 is disposed on the inner surface of phosphor screen 61. This light opaque layer preferably comprises a thin layer of aluminum of the type employed in aluminized cathode-ray tubes. However, this layer is provided with a plurality of spaced apertures or openings 64. The apertures or openings may, for example, comprise longitudinal slits with the layer 62 taking the form of stripes or bars therebetween. Alternatively the apertures may be circular or may take some other desired shape. Preferably the openings 64 occupy less than 10 percent of the total surface area on the inside of the phosphor screen although various sized openings may be employed. On the opposite side of the phosphor screen 61 between the phosphor screen and faceplate 60, a second opaque layer 66 comprises a plurality of opaque areas in substantial registry with openings 64 so that direct light perpendicularly approaching the phosphor screen will be substantially blocked. At least a small degree of overlap of layer 62 and layer 66 is desirable to allow for blocking light which is not precisely perpendicular. Thus, direct light entering at 67 will be blocked by area **66*a*, but some of this light will be reflected from area 66*a* and diffused or scattered in the phosphor layer, providing local illumination thereof. The resultant diffuse light is indicated at 70. The resultant illumination is indicated in an alternative manner with respect to area 66b. Assuming the opening opposite area 66b is illuminated by direct light, such direct light will be blocked by area 66b, but diffusion takes place in region 72 providing observable illumination on either lateral side of area 66b**.

The layer of opaque material 66 is preferably a thin aluminum layer having a thickness approximately equal to that of the usual aluminized cathode-ray tube layer. The spacing between openings 64, as well as between the corresponding portions of layer 66, is sufficiently close to provide the degree of detail desired in the light image. Also, of course, sufficient openings should be present so that a practical light image can be observed from the front of the cathode-ray tube. However, it should be noted that more projected light is conveniently available from a light source than is typically available from an electron beam trace, and therefore a certain amount of light efficiency can be sacrificed commensurate with the light intensity available.

In the foregoing embodiment employing a thin aluminum layer 62 as described, the electron beam passes through such aluminum layer as in the usual aluminized cathode-ray tube, producing light emission from the phosphor screen. The presence of the aluminum layer will almost double the brightness of the electron beam trace as viewed from the front of the cathode-ray tube because of the reflective properties of the aluminum layer. Any electron beam trace light loss occasioned by blocking produced by layer 66 will normally be more than compensated for by this increased brightness, especially in the instance where openings 64 occupy on the order of 10 percent or less of the screen area.

As an alternative, a second layer comprising opaque area 74 on the front of the faceplate may be substituted for the layer comprising opaque area 66. The operation is substantially the same as hereinbefore described.

A screen employing the configuration of FIG. 5 may also be incorporated in a storage target set forth and claimed in my copending application, Ser. No. 554,177, entitled "Combined Direct Viewing Storage Target and Fluorescent Screen Display Structure" filed May 31, 1966, and assigned to the assignee of the present invention, now U.S. Pat. No. 3,339,099, granted Aug. 29, 1967. In such instance, a storage phosphor is employed in conjunction with electron flood gun means, and storage may take place in the region of an opening 64.

As a further alternative, first and second light opaque layers may be provided on either side of the faceplate, for example, as indicated by layers 66 and 74. In such case, the positions of the openings in these layers will be such that areas of layer 74 block direct light from the openings in layer 66. Some additional loss of trace brightness would occur in this configuration, however.

A further embodiment of the present invention may also be illustrated by FIG. 5. In such an embodiment, a colored light source is employed in the projection means, and the layer 66 comprises a light filter means for blocking such colored light. Layer 62 comprises a light opaque layer with apertures. The light source, e.g., light source 20 in FIG. 1 may, for example, provide orange light and layer 66 may comprise blue filter strips. The direct light from the source will be blocked, but the scattered light, as in area 72, produces an orange image. Although the blue filter thus blocks direct light from the source no substantial loss of light from the electron beam trace need occur, since the phosphor screen 61 can provide a blue light, or at least a light having appreciable blue component.

A further embodiment is illustrated in FIG. 6. In this instance, a glass faceplate 76 is provided with a phosphor screen 78 and an opaque layer 80 on the electron beam side thereof provided with openings or apertures 82 in a manner similar to the FIG. 5 embodiment. The layer 80 is again preferably aluminum as in the case of the usual aluminized cathode-ray tube. Openings 82 are covered with an additional layer of phosphor 84 of such thickness that direct light is not readily transmitted therethrough. Scattering takes place due to the increased thickness of phosphor 84 together with screen 78 at the location of openings 82. Alternatively, the phosphor layer 84 may be densely packed or contain added opaque particles or fine particles. Scattered light will pass through as indicated at 86. The additional layer 84 may comprise phosphor dots or strips over holes or slots comprising the openings 82. The strips or dots are of such width and thickness that the principal electron beam image originates from the phosphor screen 78 between such strips or dots. This is because the thicker combination of phosphor 84 and phosphor screen 78 becomes somewhat less efficient for forming the best electron beam image, assuming screen 78 by itself is already of fairly optimum thickness. Layer 84 may be a storage phosphor and may thereby provide storage in a tube of the type described in my previously mentioned copending application.

Figures 7, 8:
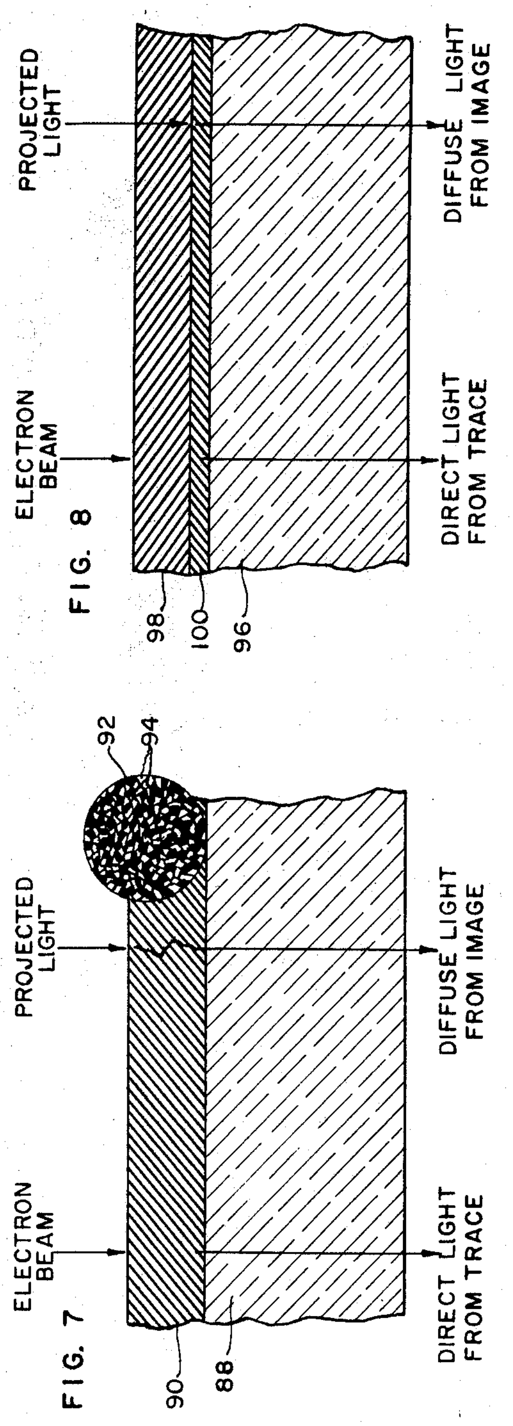
FIG. 7 is a cross section of another faceplate and screen structure.
FIG. 8 is a cross section of yet another such faceplate and screen structure.

FIG. 7 illustrates another embodiment wherein glass faceplate 88 is provided with a phosphor screen 90 including phosphor particles as indicated in black in a magnified portion 92 of the phosphor screen layer. In between the phosphor particles are mixed very small particles 94 of refracting or reflecting material, such as glass or metal for causing refraction or reflection of the light to such an extent in the phosphor layer that direct light from the projection means is scattered. Therefore, only the diffuse light from the image will be seen. Since the scattering means are not substantially light absorbing, substantially no deterioration of the electron beam image takes place.

Referring to FIG. 8, illustrating another alternative of the present invention, a glass faceplate 96 is provided with a first phosphor layer 98 and an intermediate phosphor layer 100 disposed therebetween. The intermediate phosphor layer is denser or formed of smaller particles whereby to provide a scattering means for scattering projected light in substantially the same plane as the phosphor screen. The apparatus according to this embodiment has a tendency to produce a dimmer electron beam image because of the presence of a somewhat inefficient phosphor layer 100 between the phosphor screen 98 and glass faceplate 96. Therefore, other embodiments of the present invention are preferred. Similarly, although some advantage may be gained by simply providing a thick phosphor layer on the inside of faceplate 96, that is, wherein the phosphor layers 98 and 100 are the same and are made thick enough so as to provide some degree of increased scattering of projected light, nevertheless this scattering is obtained at the expense of the electron beam image. Therefore, mere thickening of the phosphor layer, or alternatively increased density of the phosphor layer, or a finer particle layer, does not provide the advantages of efficient operation according to the present invention. An improved projected image is desired, but not at material expense to the electron beam image.

An additional embodiment of the present invention is illustrated in FIG. 1 wherein light polarizing means 102 and 104 are disposed respectively in the light path of the projection means before and after the phosphor screen 14. Here, light polarizing means 102 is located between slide 24 and condensing lens means 22, while light polarizing means 104 is disposed in front of the faceplate of the cathode-ray tube. These light polarizing means are oriented such that appreciable direct light from lamp 20 does not pass through polarizing means 104. However, the diffusion or scattering taking place in the phosphor screen 14 produces a real image which may be observed through polarizing means 104 because polarized light is depolarized by diffuse scattering. The direct light is thus blocked while the desired real image passes therethrough, being substantially unpolarized. Similarly, light from the electron beam image passes through polarizing means 104. The mirror 28 and polarizing means 104 may be arranged relative to one another to cause similar blocking of direct light without use of polarizing means 102 because a reflecting surface can be positioned to cause polarization.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A viewable display apparatus comprising:
   an electron tube including a transparent faceplate and a phosphor layer disposed on the inside of said faceplate;
   an electron source for directing electrons toward said phosphor layer;
   light projection means for providing a real image substantially in the plane of said phosphor layer, said light projection means projecting said image from the side of said phosphor layer which is toward the inside of said tube;
   means for substantially impeding direct light directed toward said phosphor layer from said projection means form passing substantially straight through said phosphor layer and faceplate;
   said impeding means comprising a first layer having a multiplicity of openings therein, and a second layer in registry with said first layer;
   said second layer having direct light blocking areas disposed in registration with the openings in said first layer in the direction of directly projected light from said light projection means;
   wherein one of said layers is positioned between the other of said layers and the point from which the display may be viewed; and
   at least one of the first and second layers being located substantially on said phosphor layer, said phosphor layer diffusing light around said light blocking areas in said second layer.

2. The apparatus according to claim 1 wherein said first layer is light opaque but electron beam transmissive and is disposed on the side of said phosphor layer toward said electron source, and wherein said light blocking areas of said second layer are light opaque.

3. The apparatus according to claim 2 wherein said phosphor layer comprises a storage phosphor, said apparatus further including electron flood gun means for providing image storage in the region of said openings in said first layer.

4. The apparatus according to claim 1 wherein said first layer is light opaque but electron transmissive and is disposed on the side of said phosphor layer toward said electron source, and wherein the light blocking areas of said second layer are light opaque, said second layer being on the outside of said faceplate.

5. The apparatus according to claim 1 wherein said first layer is light opaque and is disposed on the inside of said faceplate between said faceplate and said phosphor layer, said light blocking areas of said second area being light opaque, said second layer being disposed on the outside of said glass faceplate.

6. The apparatus according to claim 2 wherein at least said first layer is thin and is composed of aluminum.

7. The apparatus according to claim 4 wherein at least said first layer is thin and is composed of aluminum 8. The apparatus according to claim 6 wherein the area of said openings in said first layer is small compared to the remainder of said first layer.

9. Display apparatus comprising:
   an electron tube including a transparent faceplate and a phosphor layer disposed on the inside of said faceplate;
   an electron source for directing electrons toward said phosphor layer;
   light projection means for providing a real image substantially in the plane of said phosphor layer, said light projection means projecting said image from the side of said phosphor layer which is toward the inside of said tube;
   means for substantially impeding direct light directed toward said phosphor layer from said projection means from passing substantially straight through said phosphor layer and faceplate; and
   said impeding means including a light opaque but electron transmissive layer disposed on the side of said phosphor layer toward said electron gun and having openings therein, and an additional quantity of phosphor disposed over said openings on the opposite side of the plane of said light opaque layer from said phosphor layer, said additional quantity of phosphor acting to scatter direct light from said projection means.

10. The apparatus according to claim 1 wherein the light blocking areas of said second layer comprises color filtering means for filtering direct light projected to said areas in said second layer, said projection means projecting light of a color substantially filtered out by said light blocking areas of said second layer.

11. The apparatus according to claim 9 wherein at least said additional quantity of phosphor comprises a storage phosphor.

12. Display apparatus comprising:
   an electron tube including a transparent faceplate and a phosphor layer disposed on the inside of said faceplate;
   an electron source for directing electrons toward said phosphor layer;
   light projection means for providing a real image substantially in the same plane as said phosphor layer, said light projection means projecting said image from the side of said phosphor layer which is toward the inside of said tube; and
   means for substantially impeding direct light directed toward said phosphor layer from said projection means from passing substantially straight through said phosphor layer and faceplate, said impeding means comprising light polarizing means disposed in the path of light from said projection means on each side of said phosphor layer and having an orientation such as to substantially block passage of direct light from said projection means through both polarizing means, said phosphor layer diffusing light through the polarizing means remote from said electron source.

UNITED STATES PATENT OFFICE

CERTIFICATE OF CORRECTION

Patent No. 3,560,649 Dated Feb. 2, 1971

Inventor(s) ROBERT H. ANDERSON

It is certified that error appears in the above-identified patent and that said Letters Patent are hereby corrected as shown below:

ABSTRACT, line 2, "or" should be --for--;
" " 7, "occurence" should be --occurrence--.
Column 4, line 40, "from" should be--form--.
Column 6, line 61, "produces" should be --provided--;
Column 7, line 14, after "means for", insert --at all times
" " 16, "form" should be --from--
" " 22, after "in" and before "registration", insert --continuous--.

Signed and sealed this 13th day of July 1971.

(SEAL)
Attest:

EDWARD M.FLETCHER,JR.
Attesting Officer

WILLIAM E. SCHUYLER, JR
Commissioner of Patents